(12) United States Patent
Koyama (10) Patent No.: US 9,452,482 B2
(45) Date of Patent: Sep. 27, 2016

(54) ELECTRICAL DISCHARGE MACHINE

(75) Inventor: Yasuo Koyama, Kurashiki (JP)

(73) Assignee: Kurashiki System Design Co., Ltd., Kurashiki-shi, Okayama (JP)

( * ) Notice: Subject to any disclaimer, the term of this patent is extended or adjusted under 35 U.S.C. 154(b) by 385 days.

(21) Appl. No.: 14/112,511

(22) PCT Filed: Apr. 5, 2012

(86) PCT No.: PCT/JP2012/059331
§ 371 (c)(1),
(2), (4) Date: Oct. 17, 2013

(87) PCT Pub. No.: WO2012/144327
PCT Pub. Date: Oct. 26, 2012

(65) Prior Publication Data
US 2014/0042127 A1    Feb. 13, 2014

(30) Foreign Application Priority Data

Apr. 19, 2011    (JP) .................................. 2011-093135

(51) Int. Cl.
*B23H 7/06*    (2006.01)
*B23H 7/02*    (2006.01)
(Continued)

(52) U.S. Cl.
CPC ............... *B23H 1/00* (2013.01); *B23H 7/105* (2013.01); *B23H 7/26* (2013.01); *B23H 7/06* (2013.01)

(58) Field of Classification Search
CPC ............... B23H 1/00–1/10; B23H 7/00–7/38; B23H 9/00–9/18
USPC .......................... 219/69.1, 69.11–69.19, 69.2
See application file for complete search history.

(56) References Cited

U.S. PATENT DOCUMENTS 4,485,288 A * 11/1984 Schneider ................ B23H 7/06
219/69.11
4,751,362 A * 6/1988 Girardin .................. B23H 7/06
204/206

(Continued)

FOREIGN PATENT DOCUMENTS

JP    S63-36888    7/1988
JP    S63-260724   10/1988
(Continued)

OTHER PUBLICATIONS

English translation of JP 64016322A to Toshio Moro, the original JP publication published 1989.*

*Primary Examiner* — David Angwin
*Assistant Examiner* — Michael Laflame, Jr.
(74) *Attorney, Agent, or Firm* — Norton Rose Fulbright US LLP (57) ABSTRACT

An electrical discharge machine including a lower support part (2) provided to a tilt shaft (4) rotatable and extending horizontally and an upper support part (3) provided to a forward/backward shaft (5) extending parallel to the tilt shaft (4) from a support column (42) provided vertically to the tilt shaft (4) and movable forward and backward in the extending direction. The lower support part (2) includes a lower guide roller (21) that rotates in a tilting plane in which the tilt shaft (4), the support column (42), and the forward/backward shaft (5) lie, the upper support part (5) includes an upper guide roller (31) that rotates in the tilting plane in which the tilt shaft (4), the support column (42), and the forward/backward shaft (5) lie, and a wire electrode (1) is suspended around the upper guide roller (31) and the lower guide roller (21).

4 Claims, 9 Drawing Sheets

(51) Int. Cl.
  *B23H 7/26* (2006.01)
  *B23H 1/00* (2006.01)
  *B23H 7/10* (2006.01)

(56) References Cited

U.S. PATENT DOCUMENTS

| | | | | |
|---|---|---|---|---|
| 4,801,779 A | * | 1/1989 | Obara | B23H 7/065 |
| | | | | 219/69.12 |
| 4,883,934 A | * | 11/1989 | Mamin | B23H 7/06 |
| | | | | 204/224 M |
| 5,012,063 A | * | 4/1991 | Kawanabe | B23H 7/06 |
| | | | | 219/69.12 |
| 5,603,851 A | * | 2/1997 | Noda | B23H 7/102 |
| | | | | 219/69.12 |
| 5,824,985 A | * | 10/1998 | Lodetti | B23H 7/06 |
| | | | | 219/69.12 |
| 6,047,874 A | * | 4/2000 | Asai | B65H 20/22 |
| | | | | 226/110 |
| 6,278,076 B1 | * | 8/2001 | Gake | B23H 7/02 |
| | | | | 219/69.12 |

FOREIGN PATENT DOCUMENTS

| | | |
|---|---|---|
| JP | S63-312025 | 12/1988 |
| JP | S64-16322 | 1/1989 |
| JP | 2002-28826 | 1/2002 |
| JP | 2006-224215 | 8/2006 |

\* cited by examiner

ELECTRICAL DISCHARGE MACHINE

TECHNICAL FIELD

The present invention relates to an electrical discharge machine including a wire electrode.

BACKGROUND ART

In an electrical discharge machine, a workpiece is arranged while a wire electrode is moved from an upper support part to a lower support part, and the workpiece is chipped away by electrical discharge generated between the wire electrode and the workpiece (Patent Document 1 and Patent Document 2). The workpiece is formed with a cutting surface according to the wire electrode. The upper support part and the lower support part are configured of dies (cylinder provided with an insertion hole through which the wire electrode is passed) formed of a mineral (diamond, ruby, or the like) that is excellent in wear resistance with respect to the wire electrode or configured of an upper guide roller and a lower guide roller. The upper support part and the lower support part are arranged such that the dies or the upper guide roller and the lower guide roller are aligned on the same vertical line. Since the wire electrode moves downward from above, the cutting surface of the workpiece is also a vertical surface. When the wire electrode that moves from the upper support part toward the lower support part is angled, the cutting surface is also angled.

In an electrical discharge machine disclosed in Patent Document 1, an upper support arm 5 that supports an upper support part (guide head 3) and a lower support arm 5 that supports a lower support part (guide head 4) each have a gimbal suspension, and the upper support part is displaced back and forth and side to side with respect to the lower support part such that a wire electrode is angled. When the upper support part is merely displaced in this arrangement, there is a risk of the wire electrode being rubbed excessively against a die (support member 22) forming the upper support part and the lower support part. To prevent this, in the electrical discharge machine disclosed in Patent Document 1, a guide roller (pulley 21, i.e., guiding means) around which the wire electrode is wound is arranged immediately above the upper support part and immediately below the lower support part, such that the upper support part and the lower support part are angled in accordance with the angle of the wire electrode and the moving wire electrode enters or exits along an insertion hole of the die (claim 1 and FIGS. 1 to 3 in Patent Document 1).

In an electrical discharge machine disclosed in Patent Document 2, a wire electrode (wire 8) is wound around guide rollers (shaft 38 and shaft 37) provided to an upper support part (upper machining head 14) and a lower support part (lower machining head 13), respectively, that are displaced in advance. The upper support part is provided to an auxiliary table 20 that is movable in two orthogonal directions in a horizontal plane, and is rotatable so as to change the direction of the guide roller with the wire electrode (wire 8) as the center. The lower support part is provided to a support arm (arm 11) that is relatively fixed in position, and is rotatable so as to change the direction of the guide roller with the wire electrode (wire 8) as the center. As a result, the upper support part moves in the two orthogonal directions in the horizontal plane in accordance with the auxiliary table to change the angle of the wire electrode, and the upper support part and the lower support part are rotated to change the direction of the guide roller such that a vertical plane in which the angled wire electrode lies and the rotation plane of the guide rollers of the upper support part and the lower support part coincide (the lower left column on page 4 to the upper left column on page 5 in Patent Document 1).

Patent Document 1: Japanese Examined Patent Publication No. S63-036888

Patent Document 1: Japanese Patent Application Publication No. S63-260724

DISCLOSURE OF INVENTION

To angle a wire electrode of an electrical discharge machine, at least one of an upper support part and a lower support part needs to be movable in a horizontal plane. In each of the electrical discharge machines disclosed in Patent Document 1 and Patent Document 2, the upper support part is caused to move in two orthogonal directions in a horizontal plane, and, in order to prevent the angled wire electrode from being rubbed excessively against the dies or guide rollers of the upper support part and the lower support part, the die is tilted in accordance with the angled wire electrode or the guide roller is tilted or changed in direction. This means that tilting means or rotating means that adjusts to the angle of the wire electrode is provided to the upper support part in addition to each moving means that is in accordance with the moving direction in the horizontal plane, and tilting means or rotating means that adjusts to the angle of the wire electrode is provided to the lower support part.

Providing moving means, tilting means, or rotating means to each of the upper support part and the lower support part increases the number of movable parts and complexity in the device configuration. Since it is necessary to cause coordination in and accurately control each moving means, tilting means, or rotating means when a wire electrode is angled to a desired angle, there is a problem of an increase in manufacturing cost and a tendency to result in a failure. Furthermore, since electrical discharge machines including wire electrodes are often of an immersion system in which a dielectric of normal liquid (for example, water) is used such that a lower support part together with a workpiece is immersed in the liquid, it is necessary to implement a liquid-proof measure in tilting means or rotating means provided to the lower support part (refer to FIG. 1 in Patent Document 2). Thus, the structure becomes more complex to increase the manufacturing cost, and the occurrence of failures becomes more likely.

To angle a wire electrode in an electrical discharge machine including a wire electrode, an upper support part is caused to move in a horizontal plane to displace the upper support part in the horizontal direction with respect to a lower support part. In this arrangement, it is necessary to prevent rubbing between the wire electrode and dies or guide rollers of the upper support part and the lower support part. In this case, the angle of the wire electrode and the angle or direction of the dies or guide rollers of the upper support part and the lower support part are caused to coincide. In a conventional electrical discharge machine, the device configuration has been, complex in which the angle of a wire electrode and the angle or direction of a die or guide roller of an upper support part and a lower support part are caused to coincide, and there has been a problem in that a liquid-proof measure in tilting means or rotating means of the lower support part needs to be implemented, for example. To solve the problem described above, an upper support part and a lower support part have been studied.

In view of the foregoing, provided is an electrical discharge machine in which a workpiece is arranged while a wire electrode is moved from an upper support part to a lower support part and the workpiece is chipped away by an electric discharge generated between the wire electrode and the workpiece. The electrical discharge machine includes the lower support part provided to a tilt shaft rotatable and extending horizontally, and the upper support part provided to a forward/backward shaft extending parallel to the tilt shaft from a support column provided vertically to the tilt shaft and movable forward and backward in the extending direction. The lower support part includes a lower guide roller that rotates in a tilting plane (hereinafter, referred to as the "tilt plane") in which the tilt shaft, the support column, and the forward/backward shaft lie. The upper support part includes an upper guide roller that rotates in the tilt plane in which the tilt shaft, the support column, and the forward/backward shaft lie. The wire electrode is suspended around the upper guide roller and the lower guide roller.

The upper guide roller and the lower guide roller "rotating in the tilt plane in which the tilt shaft, the support column, and the forward/backward shaft lie," means that the tilt plane (for example, the vertical plane before tilt) including all of the central axes of the tilt shaft, the support column, and the forward/backward shaft and circumferential grooves along which the wire electrode is wound around the upper guide roller and the lower guide roller coincide. As in a conventional manner, the workpiece can be positioned between the upper support part and the lower support part by being placed on a workpiece platform arranged in a positional relation to encompass the tilt shaft. In the case of using a liquid dielectric, the workpiece platform, the workpiece placed on the workpiece platform, and the tilt shaft including the lower support part are immersed in the dielectric in a storage tank. The tilt shaft protrudes from the storage tank, and driving means (motor or cylinder) is arranged outside the storage tank.

In the electrical discharge machine of the present invention, the wire electrode is angled to any desired direction by tilting the upper support part and the lower support part integrally in accordance with the tilt shaft and moving the upper support part forward or backward in accordance with the forward/backward shaft in the tilt plane in which the tilt shaft, the support column, and the forward/backward shaft lie. For the sake of describing how the wire electrode is angled, two orthogonal directions in the horizontal plane in which the upper support part moves are defined as v direction (front-back direction) for the extending direction of the tilt shaft and the forward/backward shaft and u direction (left-right direction) for the direction orthogonal to the tilt shaft and the forward/backward shaft. The workpiece moves in the horizontal plane in accordance with the workpiece platform movable in a Y direction (front-back direction) that coincides with the v direction and an X direction (left-right direction) that coincides with the u direction. The u-v plane (horizontal plane) and the X-Y plane (horizontal plane) are parallel, and the vertical direction orthogonal to the two planes is a Z direction.

The lower support part provided to the tilt shaft tilts in the vertical plane facing the u direction with the tilt shaft as the center. The upper support part provided to the forward/backward shaft extending parallel to the tilt shaft from the support column provided vertically to the tilt shaft also tilts in the vertical plane facing the u direction with the tilt shaft as the center. Since the upper support part and the lower support part are tilted integrally with the tilt plane in which the tilt shaft, the support column, and the forward/backward shaft lie, the positional relation of the upper guide roller and the lower guide roller of which the rotation plane is caused to coincide with the tilt plane and the wire electrode wound around the upper guide roller and the lower guide roller is not disrupted. The wire electrode is therefore not rubbed against the upper guide roller or the lower guide roller.

The upper support part moves in the v direction in accordance with the forward/backward shaft that moves forward or backward in the v direction in the tilt plane in which the tilt shaft, the support column, and the forward/backward shaft lie. The upper guide roller and the lower guide roller cause the respective circumferential grooves along which the wire electrode is wound to coincide with the tilt plane including all of the central axes of the tilt shaft, the support column, and the forward/backward shaft. This means that the movement of the upper support part is such that the upper guide roller is moved in the v direction with respect to the lower guide roller in the tilt plane including all of the central axes of the tilt shaft, the support column, and the forward/backward shaft to merely change the wound length of the wire electrode wound around each of the upper guide roller and the lower guide roller. The wire electrode is therefore not rubbed against the upper guide roller or the lower guide roller.

It is important that the wire electrode be wound from the upper guide roller to the lower guide roller while maintaining a tensioned state. Thus, it is preferable that the upper support part include a tension roller that rotates in the tilt plane in which the tilt shaft, the support column, and the forward/backward shaft lie on the upstream side of the movement of the wire electrode and on the opposite side from the upper guide roller with the wire electrode therebetween. As a result, the wire electrode is pushed by the tension roller and does not loosen. The course of the wire electrode that reaches the upper guide roller from the tension roller meanders, and the wire electrode that moves in the vertical direction is invariably wound around the upper guide roller.

In the case where the dielectric is liquid, supplying the liquid to the moving wire electrode and causing the liquid to cling to the wire electrode can facilitate the electric discharge and reduce of friction with a member in contact with the wire electrode. The upper support part includes a swing lever that tilts parallel to the rotation plane of the upper guide roller and is pivotally attached to a rotation shaft of the upper guide roller, a nozzle that supplies the liquid of the dielectric to the wire electrode and is provided to one end of the swing lever, and a rod of a cylinder that is pivotally supported to the forward/backward shaft and is pivotally attached to another end of the swing lever. Through extension and contraction of the rod by the cylinder to swing the swing lever in accordance with the angle of the wire electrode that changes through movement of the upper guide roller in the v direction, the nozzle holds the distance to the wire electrode to be constant and causes the supplied liquid to reliably cling to the wire electrode.

It is preferable that the tilt shaft have a through-hole in the extending direction through which the wire electrode wound from the upper guide roller of the upper support part to the lower guide roller of the lower support part is passed. In the case of a configuration in which the tilt shaft penetrates the storage tank, an opening used for pulling the wire electrode out of the storage tank is not necessary if the wire electrode wound around the lower guide roller is passed through the through-hole provided in the tilt shaft. It is more preferable that the through-hole have a supply opening for the liquid of the dielectric on the upstream side of the movement of the wire electrode and a discharge opening for the liquid of the dielectric on the downstream side of the movement of the wire electrode. The liquid of the dielectric supplied to the through-hole from the supply opening moves while clinging to the wire electrode passing through the through-hole, and reduces friction of the through-hole and the wire electrode.

In the electrical discharge machine of the present invention, the angle of the wire electrode and the angle or direction in the horizontal plane of the guide rollers of the upper support part and the lower support part are caused to coincide, regardless of how the wire electrode is angled. As a result, the wire electrode can be angled to any desired direction easily and conveniently without accurate control on the upper support part and the lower support part through coordination of a plurality of driving means. Even in the case of immersing the lower support part in the storage tank for the dielectric that is liquid, a liquid-proof measure is not necessary for the lower support part. In particular, since the driving means of the tilt shaft that tilts the lower support part can be arranged outside the storage tank, a waterproof measure for the driving means is not necessary, and an increase in manufacturing cost can be prevented.

To angle the wire electrode in the left-right direction (u direction) in the present invention, it suffices to rotate only the tilt shaft and integrally tilt the tilt plane with which the rotation plane of the upper guide roller and the lower guide roller is caused to coincide and in which the tilt shaft, the support column, and the forward/backward shaft lie. To angle the wire electrode in the front-back direction (v direction), it suffices to move only the forward/backward shaft forward or backward to merely change the position of the upper guide roller in the tilt plane with which the rotation plane of the upper guide roller and the lower guide roller is caused to coincide and in which the tilt shaft, the support column, and the forward/backward shaft lie. In this manner, only one driving means to angle the wire electrode is necessary for each of the front-back direction and the left-right direction, leading to an advantageous effect of simplifying the device configuration.

If one driving means that angles the wire electrode suffices for each of the front-back direction and the left-right direction, fewer driving means suffice, which makes it easy to perform control for coordination of a plurality of driving means. This reduces the occurrence rate of failures and prevents an increase in the manufacturing cost. In the case of immersing the lower support part in the storage tank of the dielectric that is liquid as already described, rotating means of the tilt shaft being arranged outside the storage tank, such that a waterproof measure is not necessary around the lower support part also reduces the occurrence rate of failures and prevents an increase in the manufacturing cost.

BEST MODES FOR CARRYING OUT THE INVENTION

Figure 1:
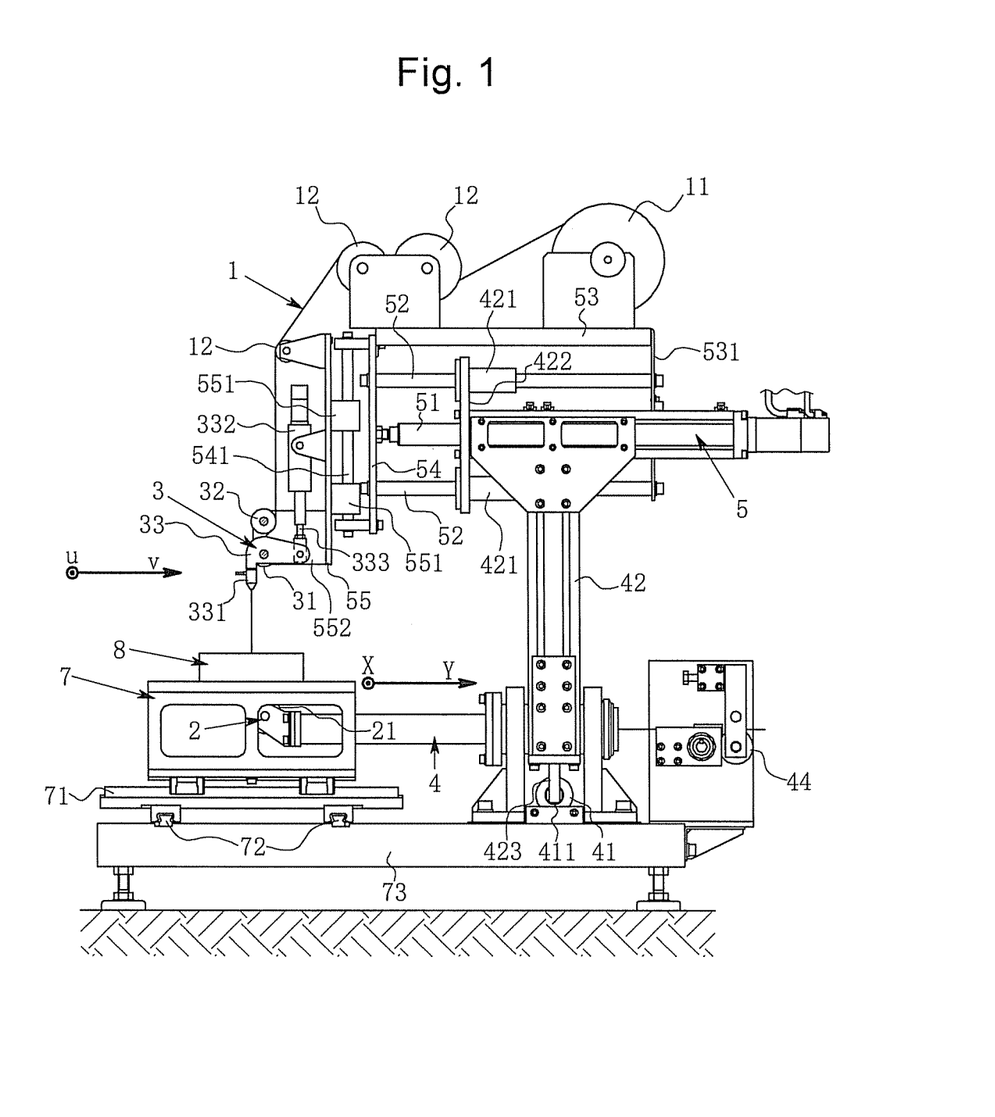
FIG. 1 is a right-side view representing one example of an electrical discharge machine to which the present invention is applied.
Figure 2:
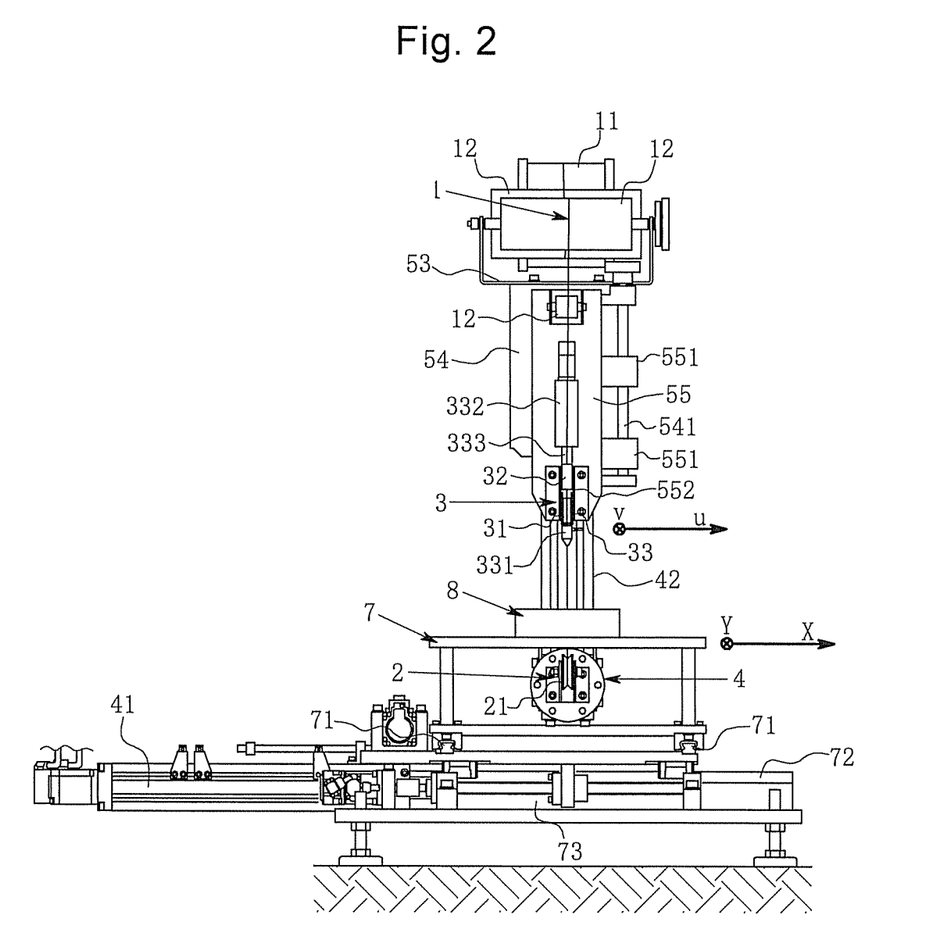
FIG. 2 is a front view of the electrical discharge machine of this example.

An embodiment of the present invention will be described below with reference to the accompanying drawings. As shown in, for example, FIGS. 1 and 2 (in which a storage tank 6 for water 61 as a dielectric is omitted for the sake of illustration), an electrical discharge machine to which the present invention is applied is configured such that a lower support part 2 is provided to a rotatable tilt shaft 4 that extends horizontally, and an upper support part 3 is provided to a forward/backward rod 51 of a forward/backward shaft 5 that is a direct acting cylinder extending parallel to the tilt shaft 4 from a support column 42 provided vertically to the tilt shaft 4 to move the forward/backward rod 51 forward or backward in the extending direction. A wire electrode 1 is unreeled from a wire reel provided to a roller attachment plate 53 that is in a reverse L shape in front view and supported by a tilt shaft 42, wound around a plurality of intermediate rollers 12, and then suspended around an upper guide roller 31 included in the upper support part 3 and a lower guide roller 21 included in the lower support part 2.

The lower support part 2 is configured by pivotally attaching the lower guide roller 21 that rotates in a tilt plane in which the tilt shaft 4, the support column 42, and the forward/backward shaft 5 lie to the left end of the tilt shaft 4. The lower guide roller 21 of this example also acts as a power feed brush roller of the lower support part 2. The tilt shaft 4 extends in the front-back direction and is supported to a base 73 to be rotatable. The support column 42 is provided vertically upward to be symmetrical about the center of rotation, and a tilt lever 423 protrudes on a 180-degree opposite side of the support column 42. The tilt shaft 4 joins a tilt rod 411 of a tilt cylinder 41 supported to the base 73 to be swingable to the tilt lever 423, and rotates through extension and contraction of the tilt rod 411. The support column 42 tilts in the left-right direction (u direction) in accordance with the rotation of the tilt shaft 4 (refer to FIGS. 8 and 9 referred to later). The support column 42 is provided vertically in a part of the tilt shaft 4 that protrudes outside the storage tank 6, and the tilt lever 423 also protrudes below the tilt shaft 4 outside the storage tank 6. The tilt rod 411 of the tilt cylinder 41 can therefore be connected to the tilt lever 423 outside the storage tank 6, and a liquid-proof measure for the tilt cylinder 41 or the tilt rod 411 is not necessary aside from sealing fitted on the outside of the tilt shaft 4 penetrating the storage tank 6.

Figure 3:
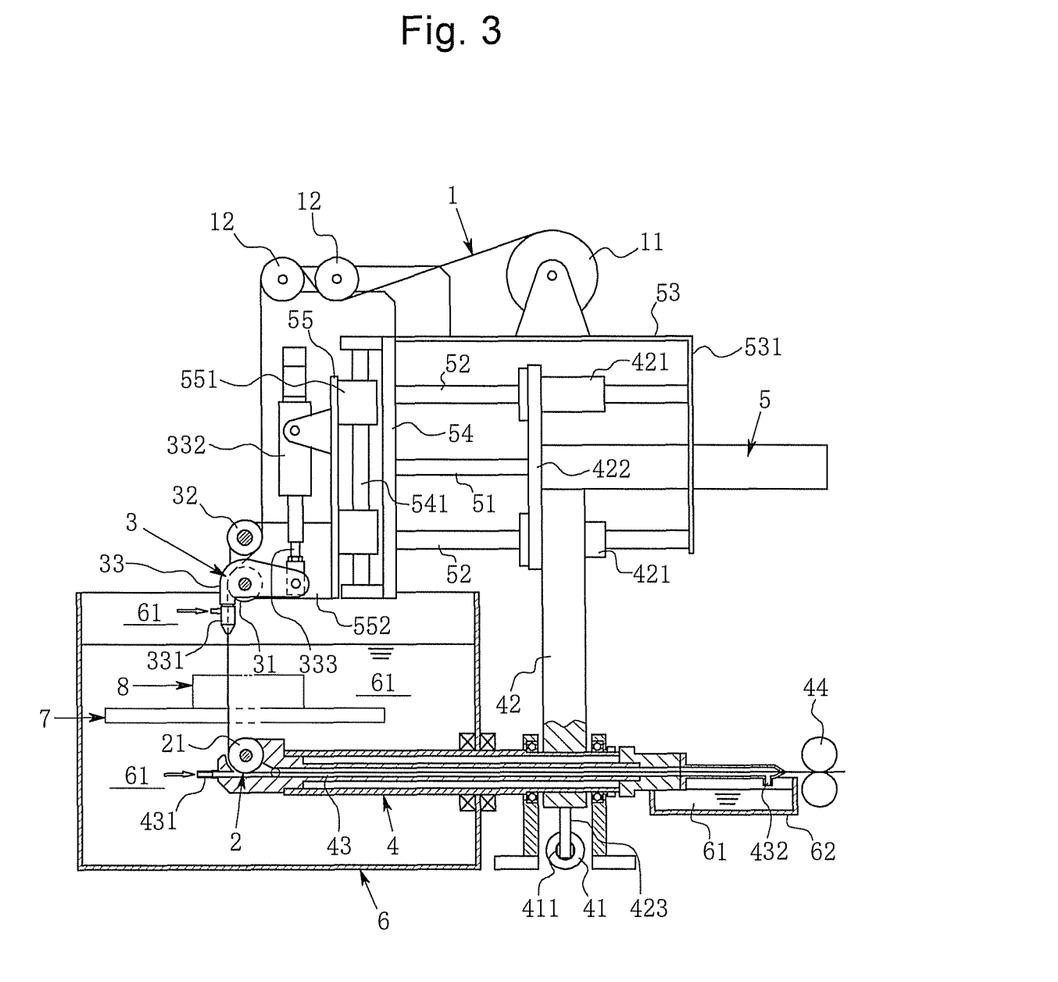
FIG. 3 is a partially broken right-side view showing a simplified view of the electrical discharge machine of this example.

The tilt shaft 4 penetrates the storage tank 6 and has a through-hole 43 that extends along the center of rotation. The wire electrode 1 wound around the lower guide roller 21 of the lower support part 2 is pulled outside the storage tank 6 through the through-hole 43 and recovered via a discharge roller 44 (refer to FIG. 3). The through-hole 43 has a supply opening 431 for the water 61 on the upstream side of the movement of the wire electrode 1 relative to the lower guide roller 21 and a discharge opening 432 for the water 61 at a rear end protruding from the storage tank 6 on the downstream side of the movement of the wire electrode. The water 61 discharged from the discharge opening 432 is stored in a discharged water receiver 62, subjected to a cleaning process, and then released or circulated for reuse. The water 61 supplied from the supply opening 431 to the through-hole 43 clings to the wire electrode 1 passing through the through-hole 43 and reduces friction between the through-hole 43 and the wire electrode 1.

The lower guide roller 21 of this example aligns a tangent line of a circumferential groove along which the wire electrode 1 is wound and the center of rotation of the tilt shaft 4 to smoothly guide the wire electrode 1 to the through-hole 43 that is caused to coincide with the center of rotation of the tilt shaft 4. By causing the tangent line of the circumferential groove of the lower guide roller 21 and the center of rotation of the tilt shaft 4 to coincide in this manner, the entire wire electrode 1 wound around the upper guide roller 31 and the lower guide roller 21 can be angled in the same direction when the upper guide roller 31 and the lower guide roller 21 are integrally tilted in the left-right direction (u direction). The angle of the wire electrode 1 with the center of rotation of the tilt shaft 4 as a reference and the horizontal movement amount of the upper guide roller 31 and the lower guide roller 21 can be easily calculated.

The upper support part 3 is configured by pivotally attaching the upper guide roller 31 that rotates in a tilt plane in which the tilt shaft 4, the support column 42, and the forward/backward shaft 5 lie to a roller support flange 552 (the roller support flange 552 on the near side are omitted in FIGS. 1 and 3 to 6) supported by the forward/backward shaft 5. A channel-structured swing lever 33 having a pair of front and rear flanges that are in an L shape in front view with the rotation axis of the upper guide roller 31 as the center of swing clamps the upper guide roller 31 of this example with the flanges. The swing lever 33 has a nozzle 331 that supplies the water 61 to the wire electrode 1 at one end below the upper guide roller 31. A swing rod 333 of a swing cylinder 332 pivotally supported to a lift plate 555 supported by the forward/backward shaft 5 is pivotally attached to another end extending rightward from the upper guide roller 31.

The wire electrode 1 is wound from the right side around a tension roller 32 provided immediately above the upper guide roller 31, wound from the left side around the upper guide roller 31, and then descended toward the lower guide roller 21 below. The tension roller 32 rotates in the tilt plane in which the tilt shaft 4, the support column 42, and the forward/backward shaft 5 lie in a similar manner to the upper guide roller 31 and the lower guide roller 21. As a result, the wire electrode 1 is pushed by the tension roller 32 and does not loosen. The course of the wire electrode 1 that reaches the upper guide roller 31 from the tension roller 32 meanders, and the wire electrode 1 does not depart from the upper guide roller 31. The tension roller 32 of this example also acts as a power feed brush roller.

The nozzle 331 causes the wire electrode 1 that is wound around the upper guide roller 31 and extends toward the lower guide roller 21 to penetrate and causes the water 61 supplied from the side to cling to the wire electrode 1 to facilitate electric discharge for a workpiece 8 as a dielectric and cool the wire electrode 1 that is heated by the electric discharge. The nozzle 331 is provided to the swing lever 33 and can therefore be angled in accordance with the angle of the wire electrode 1 (refer to FIGS. 8 and 9 referred to later) that changes by moving the upper guide roller 31 in a v direction through extension or contraction of the swing rod 333 by the swinging the swing cylinder 332 to swing the swing lever 33. Thus, the wire electrode 1 is not interfered.

The forward/backward shaft 5 of this example is configured of the direct acting cylinder that causes extension or contraction of the forward/backward rod 51, and is supported to be orthogonal at the upper end of the support column 42 provided vertically to the tilt shaft 4. The forward/backward shaft 5 fixes a support plate 422 to the front end of a tube. A pair of upper and lower guide holders 421 parallel to the forward/backward rod 51 are provided at the top and bottom of the support plate 422. The guide holders 421 receive a pair of upper and lower guide bars 52. The guide bars 52 are sandwiched between an auxiliary plate 531 that is a vertical surface of the roller attachment plate 53 in an L shape in front view and a lift reference plate 53 parallel to the auxiliary plate 531. The roller attachment plate 53 tilts a wire reel 11 attached to the upper surface or the intermediate roller 12 in the left-right direction integrally with the tilt plane in which the tilt shaft 4, the support column 42, and the forward/backward shaft 5 lie. With this configuration, the wire electrode 1 unreeled from the wire reel 11 is not twisted even if the wire electrode 1 is angled.

The lift reference plate 53 holds an external thread shaft 541 that extends vertically. The roller support flange 552 pivotally attached with the swing lever 33 protrudes from a lift plate 55 provided with internal thread blocks 551 screwed to the external thread shaft 541. With this configuration, the upper support part 3 ascends and descends together with the swing lever 33 in accordance with the lift plate 55 that causes the external thread shaft 541 to rotate to ascend and descend, thereby adjusting the vertical position. It suffices that the vertical position of the upper support part 3 be adjusted at the start of an electric discharge according to the size of the workpiece 8. The external thread shaft 541 may therefore be rotated automatically using a motor or the like or may be rotated manually by a handle operation, for example.

The workpiece 8 is placed on a workpiece platform 7 formed of a frame body through which the wire electrode 1 can be vertically passed, and is immersed in the water 61 in the storage tank 6 (omitted for the sake of illustration in FIGS. 1 and 2, refer to FIG. 3) together with the workpiece platform 7. The workpiece platform 7 is placed on a Y-direction rail 71 extending in the front-back direction, and the Y-direction rail 71 is placed on an X-direction rail 72 extending in the left-right direction and fixed to the base 73. With this configuration, the workpiece platform 7 is movable in the front-back direction and the left-right direction in accordance with the X-direction rail 72 and the Y-direction rail 71. Since the workpiece platform 7 can have a configuration the same as or similar to that of a conventional electrical discharge machine of the same type, various types of conventionally known moving means (for example, a direct acting cylinder, rotation cylinder, motor, ball screw mechanism, or the like) can be used.

In the electrical discharge machine of the present invention, the upper support part 3 and the lower support part 2 are tilted integrally as the tilt plane in which the tilt shaft 4, the support column 42, and the forward/backward shaft 5 lie to angle the wire, electrode 1 in the left-right direction (u direction), and the upper support part 3 is moved in the front-back direction relatively with respect to the lower support part 2 in the tilt plane in which the tilt shaft 4, the support column 42, and the forward/backward shaft 5 lie to angle the wire electrode 1 in the front-back direction (v direction). The angle of the wire electrode 1 in any desired direction can be achieved through a combination of the angles in the front-back direction and the left-right direction. How the wire electrode 1 is angled specifically through movement of the upper support part 3 to the front and back or the left and right in the electrical discharge machine of this example will be described below.

Figure 4:
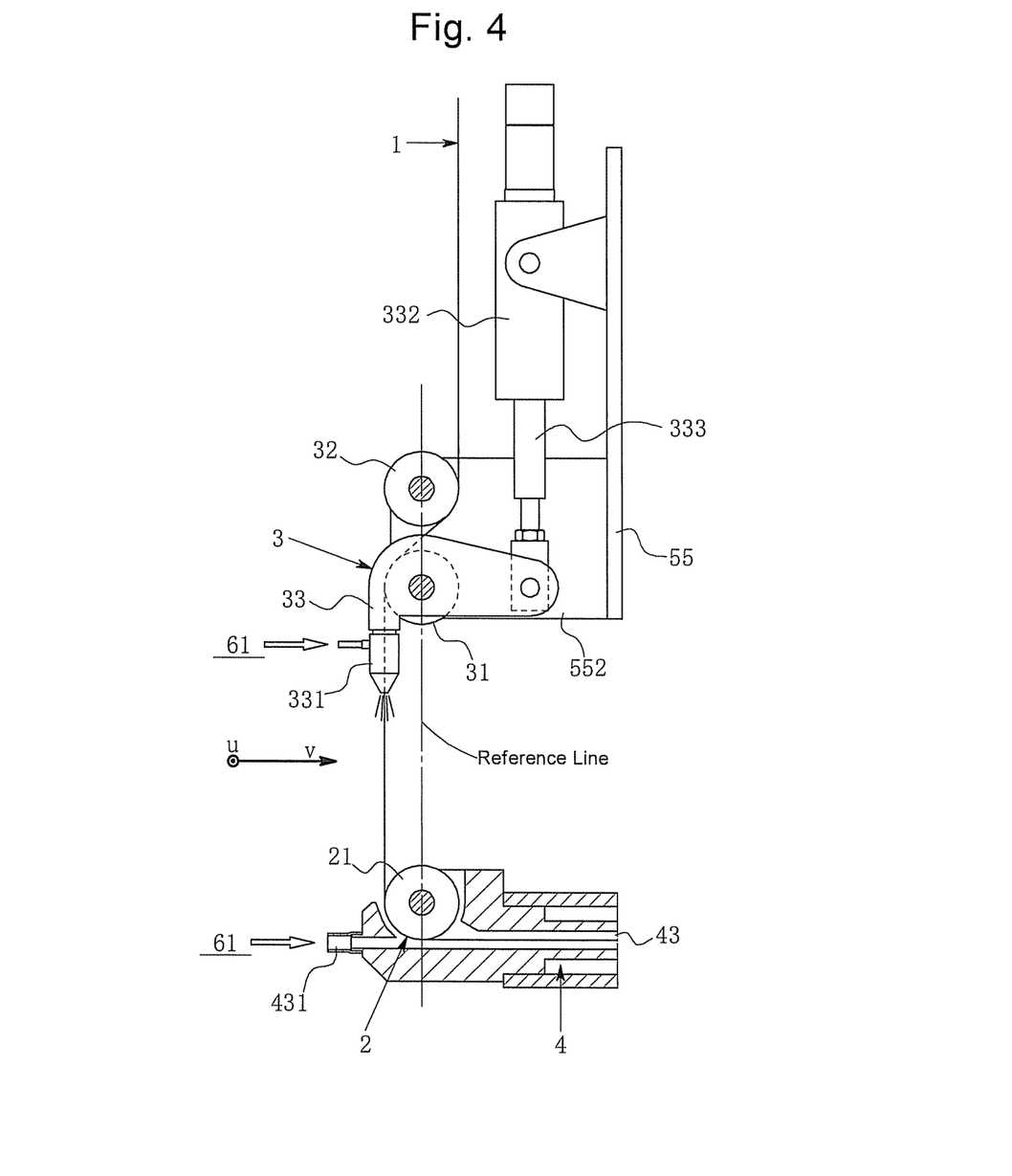
FIG. 4 is an enlarged right-side view of a middle part in FIG. 3 representing a state in which an upper support part is positioned immediately above a lower support part.
Figure 5:
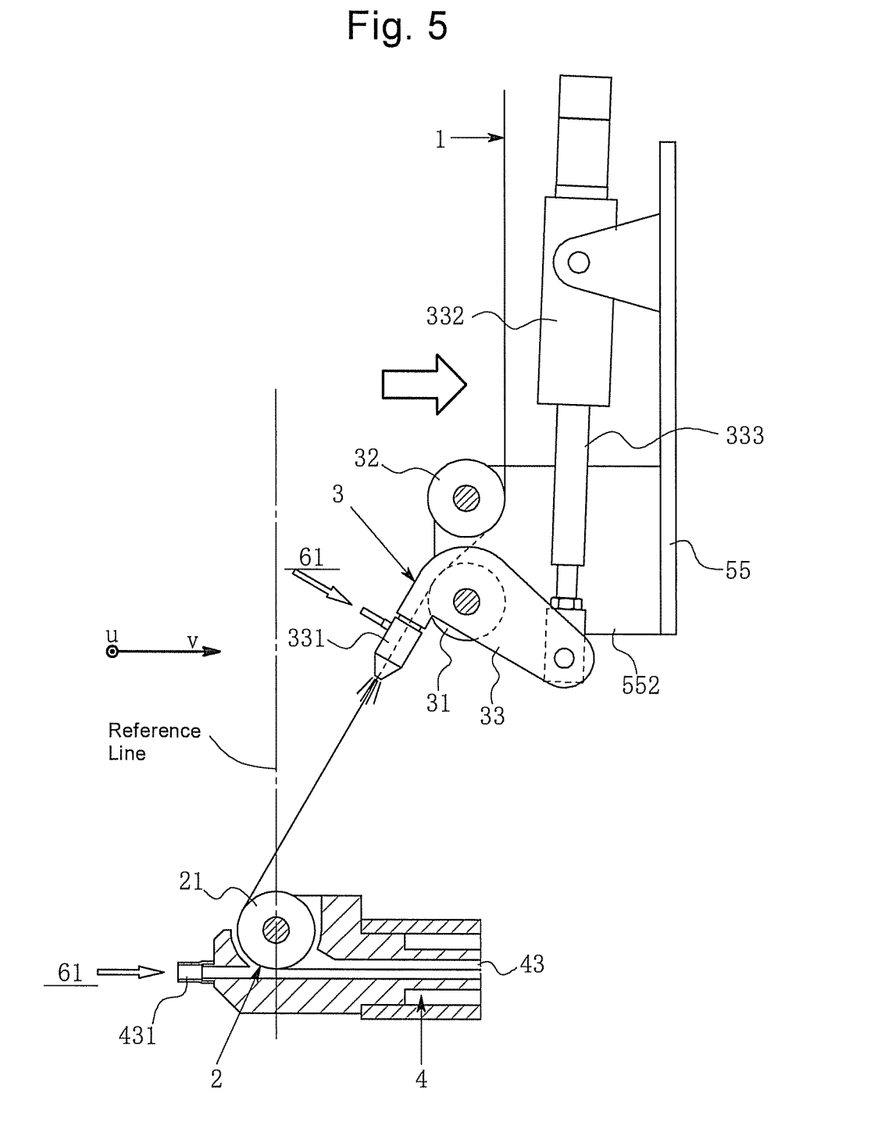
FIG. 5 is an enlarged right-side view of the middle part in FIG. 3 representing a state in which the upper support part is positioned on the positive side in a v direction with respect to the lower support part.
Figure 6:
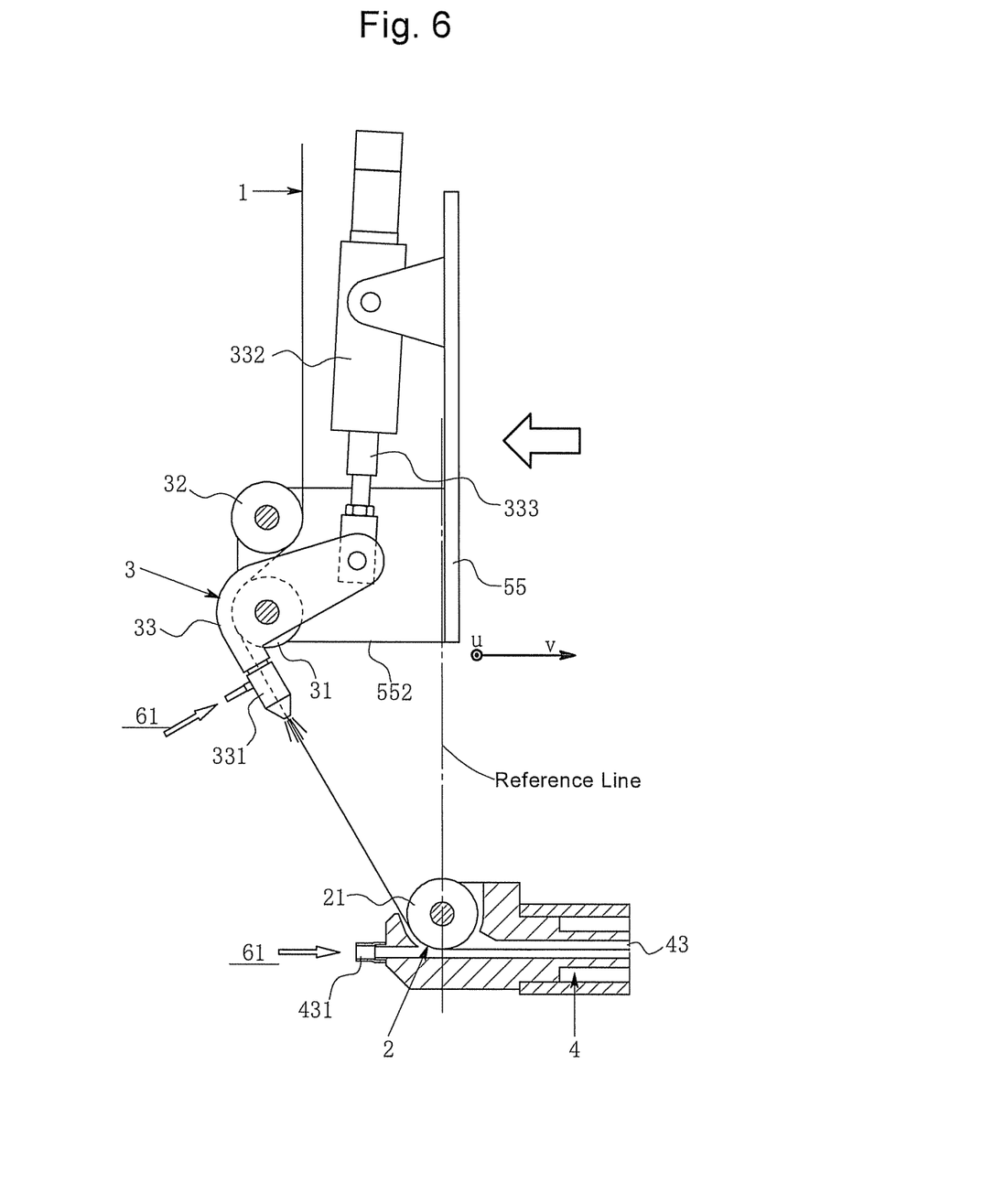
FIG. 6 is an enlarged right-side view of the middle part in FIG. 3 representing a state in which the upper support part is positioned on the negative side in the v direction with respect to the lower support part.

With reference to FIGS. 4 to 6, a case where the upper support part 3 is moved in the front-back direction with respect to the lower support part 2 to angle the wire electrode 1 in the front-back direction will be described. When the upper support part 3 and the lower support part 2 are caused to coincide with a reference line in the vertical direction and the tilt plane in which the tilt shaft 4, the support column 42, and the forward/backward shaft 5 lie is not angled (refer to FIG. 7 referred to later), the wire electrode 1 is not angled to either the left-right direction (u direction) or the front-back direction (v direction) and descends straight in the vertical direction, as shown in FIG. 4. A case where the tilt plane in which the tilt shaft 4, the support column 42, and the forward/backward shaft 5 lie is not angled is given for the sake of description. However, since the wire electrode 1 can be angled in the front-back direction (v direction) in the tilt plane, the wire electrode 1 can be angled in the front-back direction (v direction) in an angled tilt plane through movement of the upper support part 3 in the front-back direction, even if the tilt plane is angled in the left-right direction (u direction).

When the forward/backward rod 51 (refer to FIG. 1) of the forward/backward shaft 5 is contracted from the state represented in FIG. 4, the upper support part 3 moves to the rear direction (the positive side in the v direction) integrally with a lift reference plate 54 and the lift plate 55, as shown in FIG. 5 (refer to the white arrow in FIG. 5). At this time, only the angle of the tangent line with respect to the tension roller 32, the upper guide roller 31, and the lower guide roller 21 changes, and the wire electrode 1 is not twisted and rubbed. Since the swing cylinder 332 extends the swing rod 333 to swing the swing lever 33 clockwise such that the nozzle 331 that supplies the water 61 is angled to an attitude that coincides with the tangent line of the upper guide roller 31, the wire electrode 1 is not twisted and rubbed.

In contrast, when the forward/backward rod 51 (refer to FIG. 1) of the forward/backward shaft 5 is extended from the state represented in FIG. 4, the upper support part 3 moves to the forward direction (the negative side in the v direction) integrally with the lift reference plate 54 and the lift plate 55, as shown in FIG. 6. At this time, only the angle of the tangent line with respect to the tension roller 32, the upper guide roller 31, and the lower guide roller 21 changes, and the wire electrode 1 is not twisted and rubbed. Since the swing cylinder 332 contracts the swing rod 333 to swing the swing lever 33 counterclockwise such that the nozzle 331 that supplies the water 61 is angled to an attitude that coincides with the tangent line of the upper guide roller 31, the wire electrode 1 is not twisted and rubbed.

Figure 7:
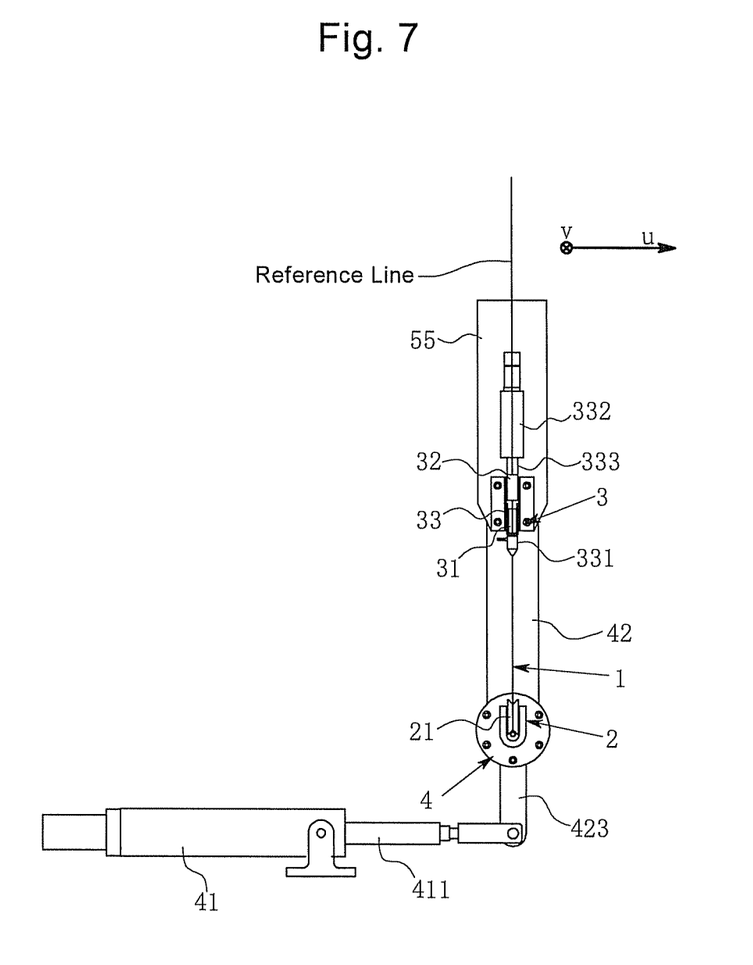
FIG. 7 is an enlarged front view of the middle part in FIG. 3 representing a state in which the upper support part is positioned immediately above the lower support part.
Figure 8:
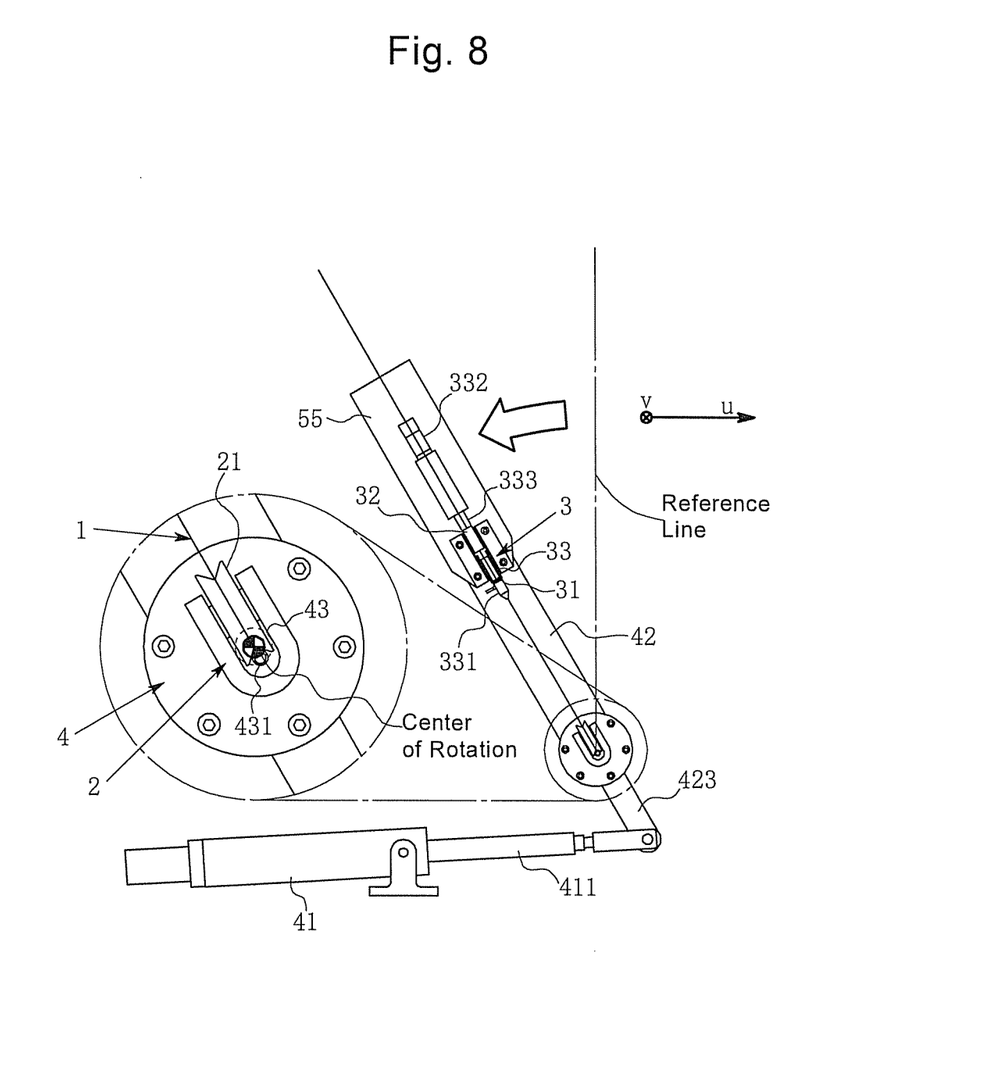
FIG. 8 is an enlarged front view of the middle part in FIG. 3 representing a state in which the upper support part is positioned on the negative side in a u direction with respect to the lower support part.
Figure 9:
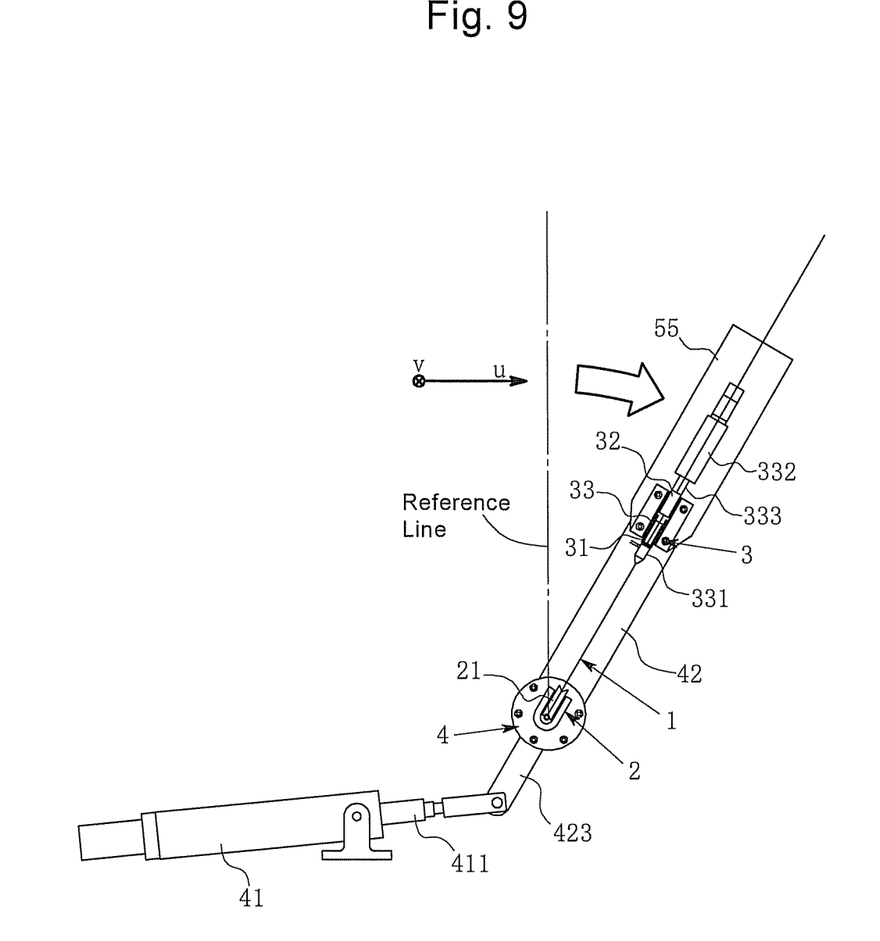
FIG. 9 is an enlarged front view of the middle part in FIG. 3 representing a state in which the upper support part is positioned on the positive side in the u direction with respect to the lower support part.

With reference to FIGS. 7 to 9, a case where the upper support part 3 and the lower support part 2 are angled integrally with the tilt plane in which the tilt shaft 4, the support column 42, and the forward/backward shaft 5 lie will be described. Regardless of whether the upper support part 3 and the lower support part 2 coincide with the reference line in the vertical direction (refer to FIG. 4 referred to earlier) or not (refer to FIGS. 5 and 6 referred to earlier), the wire electrode 1 is not angled in the left-right direction and descends straight in the vertical direction, as shown in FIG. 7, when the tilt plane in which the tilt shaft 4, the support column 42, and the forward/backward shaft 5 lie is not angled. As already described, the wire electrode 1 can be angled in the left-right direction (u direction) as is in the angled attitude, even when angled in the front-back direction (v direction) in the tilt plane in which the tilt shaft 4, the support column 42, and the forward/backward shaft 5 lie (for example, in a state of FIG. 5 or FIG. 6).

When the tilt cylinder 41 extends the tilt rod 411 from the state represented in FIG. 7, the tilt lever 423 protruding downward from the tilt shaft 4 is pushed to the right direction (the positive side in the u direction), the tilt plane in which the tilt shaft 4, the support column 42, and the forward/backward shaft 5 lie is integrally angled relatively to the left direction (the negative side in the u direction), and the upper support part 3 and the lower support part 2 are angled to the left direction (the negative side in the u direction) at the same angle in accordance with the tilt plane, as shown in FIG. 8. At this time, the wire electrode 1 is merely wound around the upper guide roller 31 and the lower guide roller 21 angled at the same angle, and therefore is not twisted and rubbed with respect to the upper guide roller 31 and the lower guide roller 21. Since the wire electrode 1 wound around the lower guide roller 21 and passing through the through-hole 43 is caused to coincide with the tilt shaft in the electrical discharge machine of this example, the angle of the wire electrode 1 in the left-right direction (u direction) is easily calculated by taking only the angle of the upper support part 3 into consideration.

When the tilt cylinder 41 contracts the tilt rod 411 from the state represented in FIG. 7 in contrast to what is described above, the tilt lever 423 protruding downward from the tilt shaft 4 is pulled to the left direction (the negative side in the u direction), the tilt plane in which the tilt shaft 4, the support column 42, and the forward/backward shaft 5 lie is integrally angled relatively to the right direction (the positive side in the u direction), and the upper support part 3 and the lower support part 2 are angled to the front (the positive side in the u direction) at the same angle in accordance with the tilt plane, as shown in FIG. 9. At this time, the wire electrode 1 is merely wound around the upper guide roller 31 and the lower guide roller 21 angled at the same angle, and therefore is not twisted and rubbed with respect to the upper guide roller 31 and the lower guide roller 21. In this manner, the electrical discharge machine of the present invention has an advantageous effect that the wire electrode 1 is not twisted and rubbed against the upper support part 3 or the lower support part 2 (specifically, the upper guide roller 31 and the lower guide roller 21) even when angled to either the left-right direction (u direction) or the front-back direction (v direction).

1 Wire electrode
2 Lower support part
21 Lower guide roller
3 Upper support part
31 Upper guide roller
32 Tension roller
33 Swing lever
331 Nozzle
332 Swing cylinder
333 Swing rod 4 Tilt shaft
42 Support column
43 Through-hole
431 Supply opening
432 Discharge opening
5 Forward/backward shaft
51 Forward/backward rod
6 Storage tank
61 Water
7 Workpiece platform
8 Workpiece

The invention claimed is:

1. An electrical discharge machine in which a workpiece is arranged while a wire electrode is moved from an upper support part to a lower support part and the workpiece is chipped away by an electric discharge generated between the wire electrode and the workpiece, the electrical discharge machine comprising:
    the lower support part provided to a tilt shaft rotatable and extending horizontally; and
    the upper support part provided to a forward/backward shaft extending parallel to the tilt shaft from a support column provided vertically to the tilt shaft and movable forward and backward in the extending direction, wherein
    the lower support part includes a lower guide roller that rotates in a tilting plane in which the tilt shaft, the support column, and the forward/backward shaft lie,
    the upper support part includes an upper guide roller that rotates in the tilting plane in which the tilt shaft, the support column, and the forward/backward shaft lie,
    the wire electrode is suspended around the upper guide roller and the lower guide roller, and
    the upper support part includes a swing lever that tilts parallel to the rotation plane of the upper guide roller and is pivotally attached to a rotation shaft of the upper guide roller, a nozzle that supplies liquid of a dielectric to the wire electrode and is provided to one end of the swing lever, and a rod of a cylinder that is pivotally supported to the forward/backward shaft and is pivotally attached to another end of the swinq lever.

2. The electrical discharge machine according to claim 1, wherein the upper support part includes a tension roller that rotates in the tilting plane in which the tilt shaft, the support column, and the forward/backward shaft lie on the upstream side of movement of the wire electrode and on the opposite side from the upper guide roller with the wire electrode therebetween.

3. The electrical discharge machine according to claim 1 or 2, wherein the tilt shaft has a through-hole in the extending direction through which the wire electrode wound from the upper guide roller of the upper support part to the lower guide roller of the lower support part is passed.

4. The electrical discharge machine according to claim 1 or 2, wherein
    the tilt shaft has a through-hole in the extending direction through which the wire electrode wound from the upper guide roller of the upper support part to the lower guide roller of the lower support part is passed, and
    the through-hole has a supply opening for liquid of a dielectric on the upstream side of movement of the wire electrode and a discharge opening for the liquid of the dielectric on the downstream side of the movement of the wire electrode.

* * * * *